Aug. 7, 1945.  A. VASZIN  2,381,193
TOW LINE THIMBLE
Filed May 1, 1944  2 Sheets-Sheet 1
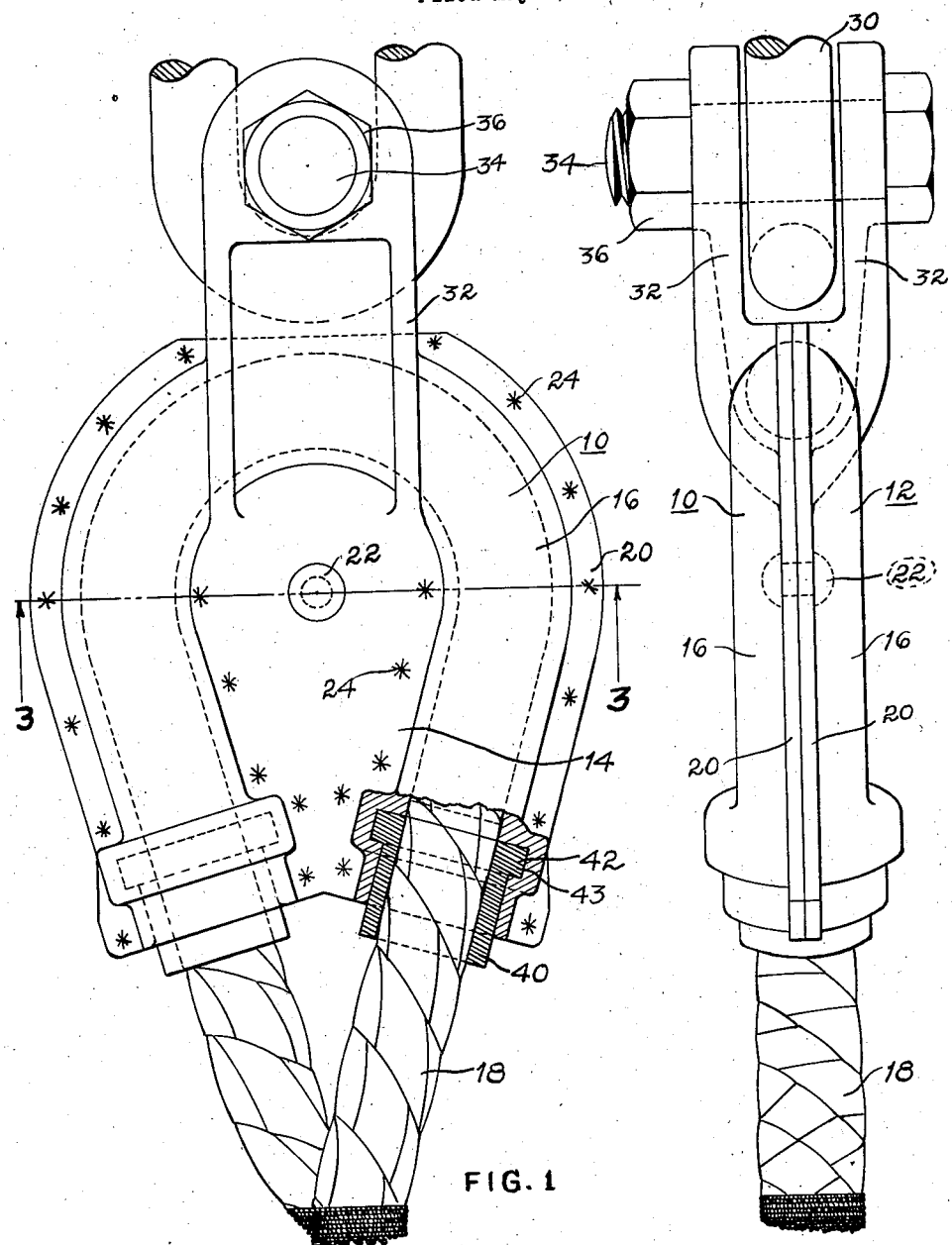
FIG. 1
FIG. 2
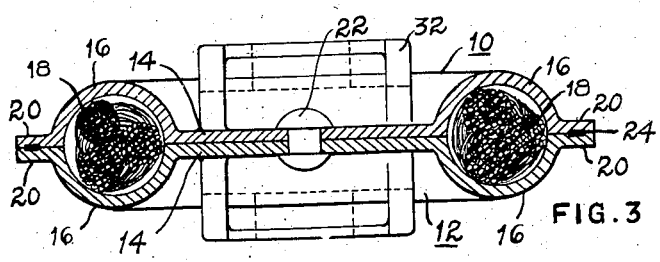
FIG. 3

Aug. 7, 1945.   A. VASZIN   2,381,193
TOW LINE THIMBLE
Filed May 1, 1944   2 Sheets-Sheet 2

Patented Aug. 7, 1945

2,381,193

UNITED STATES PATENT OFFICE 2,381,193

TOWLINE THIMBLE

Aurel Vaszin, Dayton, Ohio

Application May 1, 1944, Serial No. 533,607

4 Claims. (Cl. 287—81)

This invention relates to a fastening device and more particularly to a thimble for use in connecting a rope or a cable into use.

An object of this invention is to provide a thimble that is easily produced, sturdy and so constructed that the thimble will not fail or become easily mutilated by sudden impacts.

Another object of this invention is to provide a thimble adapted for use in connection with tow lines and more particularly with tow lines used in towing gliders and the like, where the tow line is released and permitted to drop to the ground. The thimble is provided with cushioning means surrounding the rope or cable in the vicinity of the thimble, so that the rope or cable is not easily cut or damaged when the tow line drops to the ground.

Other objects and advantages reside in the construction of parts, the combination thereof and the mode of operation, as will become more apparent from the following description.

Referring to the drawings, Figure 1 discloses a plan view of the thimble.

Figure 2 is a side elevational view of the thimble shown in Figure 1.

Figure 3 is a cross sectional view taken substantially on the line 3—3 of Figure 1.

Figure 4:
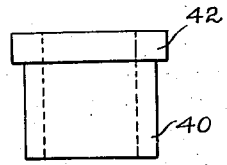

Figure 4 discloses a flanged rubber sleeve mounted in the end of the thimble and surrounding the rope or cable.

Figure 6:
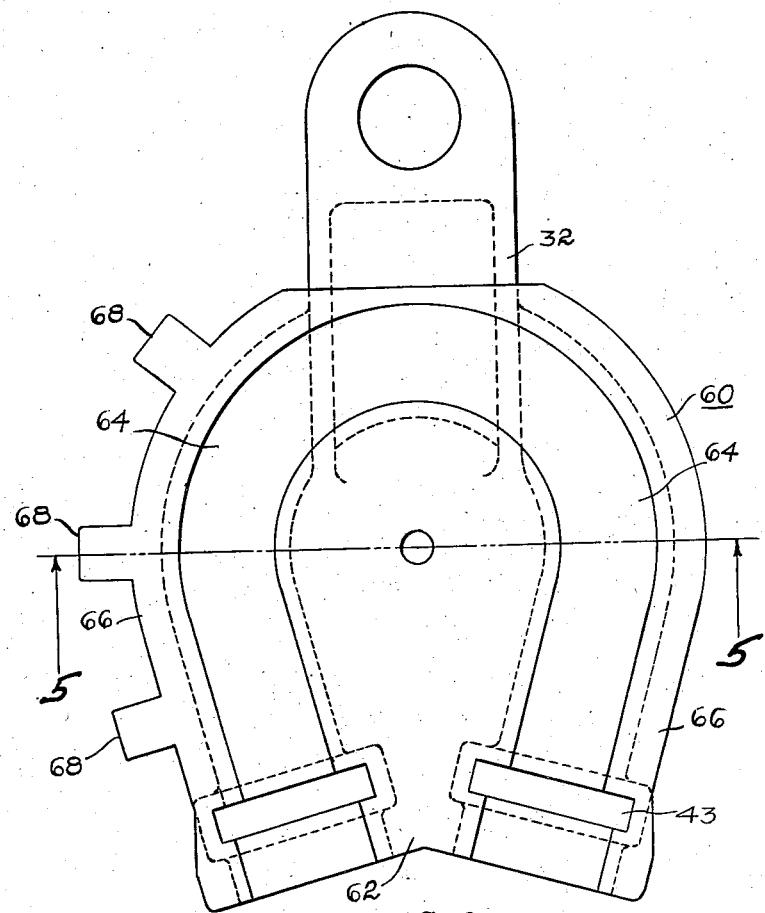
Figure 5:
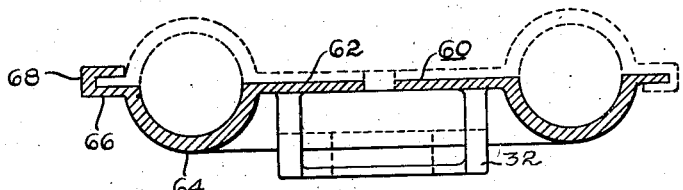

Figure 5 is a cross sectional view of one-half of the thimble, taken substantially on the line 5—5 of Figure 6.

Figure 6 is a side elevational view of the modification shown in Figure 5.

In the drawings, the reference numerals 10 and 12 indicate the two halves that constitute the main body portion of the thimble. Each of these halves includes a centrally disposed web portion 14 merging into a semi-circular channel portion 16 that cooperates with a like channel portion of the other member, so as to form a horseshoe-shaped channel for the rope or cable 18. A flange portion 20 extends beyond the channel portion 16. The two halves are held together by a fastening member, such as a rivet 22, passing through the center of the web portions 14. Furthermore, the two members are held together by spot welding on the outside and on the inside of the channel portion 16, as indicated schematically by the asterisks 24.

In order to fasten or attach the thimble to a tow bar or draw bar 30, members 10 and 12 are provided with extensions 32 cooperating to form a clevis receiving a clevis pin or bolt 34 held in position with a suitable nut or other fastening device 36.

A tubular rubber sleeve 40 surrounds the rope or cable at the exit of the aperture formed by the channel portions 16. This tubular rubber sleeve is provided with an annular flange 42 projecting into a suitable annular channel 43 surrounding the rope and formed in members 10 and 12. This tubular rubber sleeve 40 that projects beyond members 10 and 12 protects the rope or cable from being cut by the metallic edges when the rope or cable, together with the thimble, drops upon being liberated or upon receiving other impacts.

In the modification disclosed in Figures 5 and 6, a pair of members 60, only one of which has been shown in full line, are each provided with a web portion 62 and a semi-annular channel portion 64. Beyond the semi-annular channel portion 64 is a flange 66 provided with a plurality of ears or lugs 68 that are bent over, so as to engage the flange of the opposite member. As may best be seen by referring to Figure 6, the lugs 68 are located on one side only of member 60. The other side of member 60, shown in Figure 6, is engaged by the lugs of the opposite member, as shown in dotted line in Figure 5. In other respects the members shown in Figure 5 are substantially identical to those shown in the preferred embodiment.

The thimble disclosed herein was first designed for use with a tow line for towing a glider behind an airplane. When the glider is released, the tow line drops to the ground, and in so doing, the thimble is damaged unless it is made sufficiently strong to withstand the impact. Furthermore, the rope, as it projects from the thimble, is oftentimes damaged in the absence of the tubular rubber sleeve, which protects the rope.

In the preferred embodiment and the modification, two halves have been shown, the halves being secured together in any suitable manner. Instead of making the assembly from two halves, the entire assembly may be cast in one unit, in which event the rope or cable would be threaded or inserted through the aperture forming a horseshoe-shaped path.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A thimble for use with a rope or cable including a pair of members each having a web portion merging into a semi-annular channel, the semi-annular channels of the two members cooperating to form a round aperture having a horseshoe contour into which a loop of the rope or cable is seated, each of said members including a flange extending beyond the channel for attaching the members together, and means for securing the channels together so as to hold the channels in a unitary structure.

2. In a thimble assembly for connecting tow lines of airplanes to a draw bar, a pair of members cooperating to form the main body portion of the thimble, and a pair of tubular sleeve members attached to the main body portion of the thimble and projecting beyond the main body portion of the thimble to surround the tow line to protect the same while in use.

3. A thimble for use with a rope or cable including a pair of members each having a web portion merging into a semi-annular channel, the semi-annular channels of the two members cooperating to form a round aperture having a horseshoe contour into which a loop of the rope or cable is seated, each of said members including a flange extending beyond the channel for attaching the members together, and means for securing the channels together so as to hold the channels in a unitary structure, said means including lugs integral with one side of the flange of each member and the lugs on each flange gripping the other side of the flange of the other member to hold the members together.

4. A thimble assembly for use with a rope or cable, said thimble including a body member having an enlarged horseshoe-shaped portion, an aperture extending through the horseshoe-shaped portion and having a horseshoe-shaped contour for the reception of the rope or cable, web-like means extending from the sides of the horseshoe-shaped portion to reenforce the same, extension means for attaching the thimble, said extension means including apertured clevis-like portions, and fastening means extending through the apertures in said clevis-like portions.

AUREL VASZIN.